Figure 1:
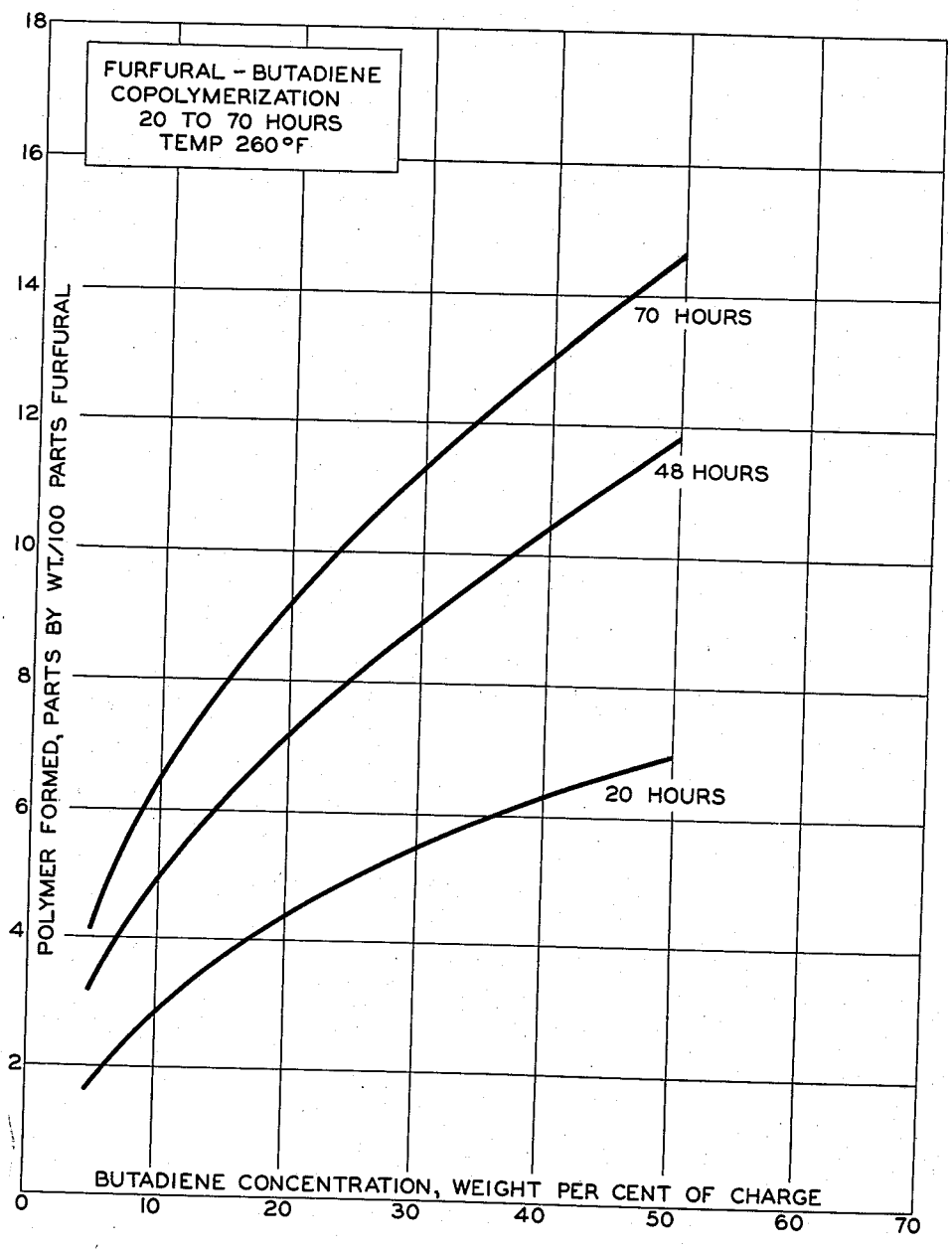

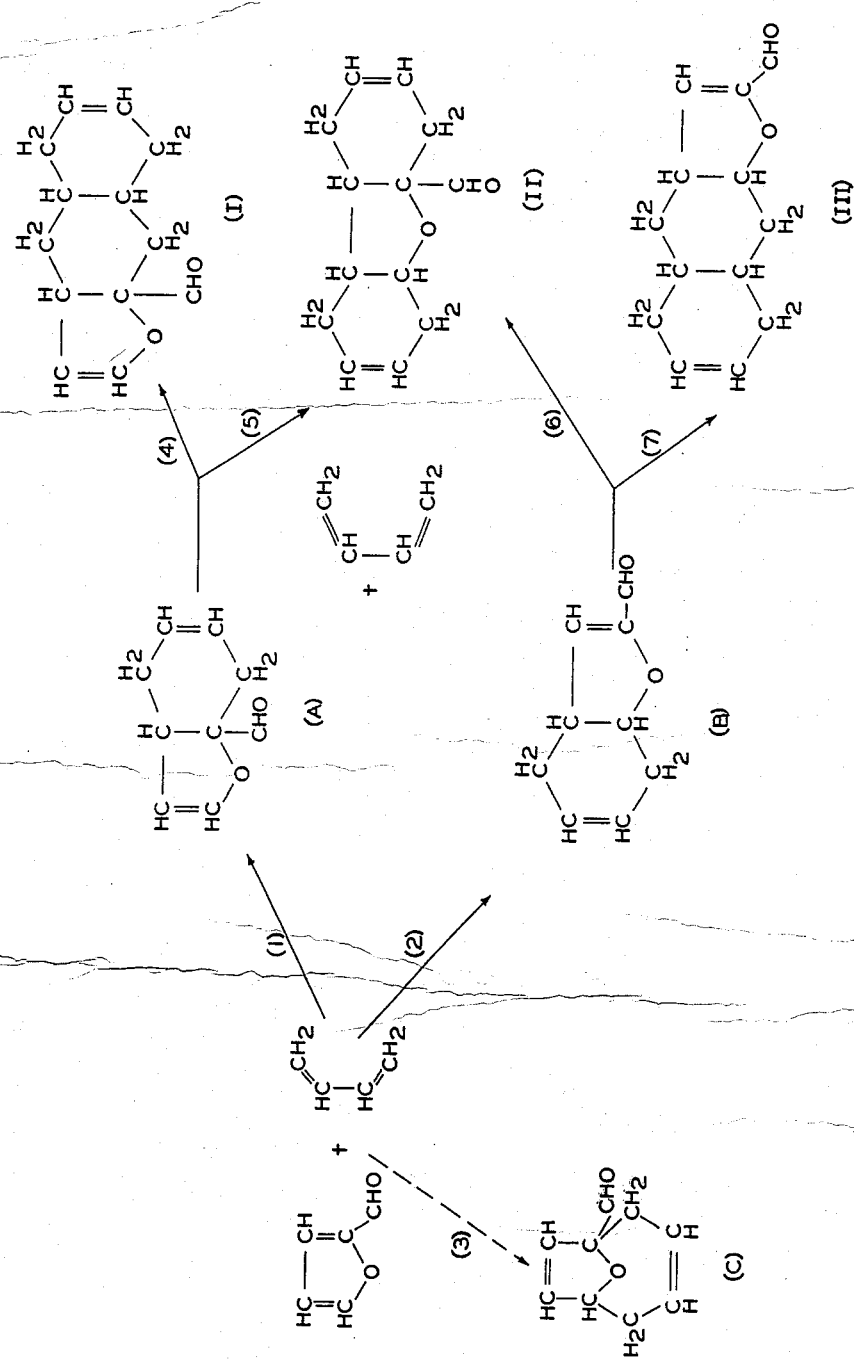
FIG. 3 POSSIBLE MECHANISMS FOR FURFURAL-BUTADIENE REACTION

Patented July 6, 1954

2,683,151

UNITED STATES PATENT OFFICE 2,683,151

PROCESS FOR REACTING A DIOLEFIN AND A FURFURALDEHYDE AND RESULTING PRODUCTS

John C. Hillyer, Bartlesville, Okla., and Daniel A. Nicewander, Rock Island, Tex., assignors to Phillips Petroleum Company, a corporation of Delaware Application March 14, 1949, Serial No. 81,413

21 Claims. (Cl. 260—346.2)

The present invention relates to a process for the inter-reaction of a diolefin and a furfural. This invention relates also to various products of such inter-reactions. This application is a continuation-in-part of our forfeited copending application Serial No. 746,816, filed May 8, 1947, which itself is a continuation-in-part of our forfeited copending application Serial No. 647,178, filed February 12, 1946.

When furfural is maintained at elevated temperatures for more or less extended periods of time, dark colored tarry polymers of very high molecular weight are formed. These substances are indefinite in composition and properties, and have no known commercial value. It is known that furfural in the presence of unsaturated hydrocarbons forms dark colored tarry furfural poylmers which may be dried or oxidized to form a solid polymeric material. This polymer is soluble in furfural and in acetone, but is of little, if any, commercial value.

We have found that a diolefin such as 1,3-butadiene and its immediate homologues may be reacted with a furfural such as furfural itself and its immediate homologues, in the presence of water to produce new products including aldehydes and lactones, which have a polycyclic structure. Since these polycyclic products are generally produced in a mixture also containing polymers of butadiene, polymers of furfural, and other complex materials of a polymeric nature, and since their chemical identities were originally unknown, the terms "polymers" and "co-polymers" have been loosely applied to the novel polycyclic chemical compounds disclosed and discussed herein, as well as to these other polymeric materials. In view of the identification of certain of these materials as definite chemical compounds, as discussed herein, the use of the term "polymers" tends to be misleading and the products are more accurately defined as polycyclic reaction products. When reacting 1,3-butadiene with furfural, one of the major reaction products is a pale yellow or amber colored oil, in marked contrast with the tarry mass referred to hereinbefore. The crude oil apparently is a somewhat complex mixture of various reaction products. It has a boiling range of from about 200° F. to about 320° F. under a pressure of about one millimeter of mercury absolute. The refractive index at 77° F. ranges from about 1.520 to about 1.530 and the specific gravity at 68° F. ranges from about 1.08 to 1.16. The average molecular weight was determined as about 210. The physical properties of various fractions of the oil vary somewhat within the indicated boiling range. The average refractive index at 77° F. is about 1.526 while the average specific gravity at 68° F. is about 1.12.

In the fractional distillation of the oil produced by the process of this invention, various fractions may be obtained as products of the process. The physical properties of the products may thus be varied somewhat by separating the oil into fractions having various boiling point ranges. For example, fractions of different viscosity may be obtained by fractional distillation to produce on the one hand an oil of low viscosity and on the other, an oil of high viscosity or one having a slurry-like consistency. The aldehydic content is variable depending on conditions used, in general the content is between 40 and 80 mol per cent, but under suitable operating conditions almost any value between zero and 100 per cent can be obtained. We have found, for instance, that the product distilling near the upper end of the boiling range is generally very low in aldehyde content. By pentane extraction of a lower boiling fraction on the other hand, a product of very high aldehydic content is obtained.

The degree of unsaturation of the fractions is also influenced to some degree by reaction conditions, such as temperature and time of treatment.

The characteristic nature of our unique products gives them numerous potential uses. Among these may be included their use as components in phenolic resins, plasticizers, tackifiers for synthetic rubber, and the like, as intermediates for the syntheses of numerous organic chemicals, such as by condensation of other reactive molecules with either the unsaturated portion of the molecule, the aldehyde group of the aldehyde products, or the potential carboxyl group of the lactone products, or for other uses which will become apparent to one skilled in the art.

An object of our invention is to produce useful products by the reaction of 1,3-butadiene and furfural.

Another object of our invention is to produce useful products by the reaction of a diolefin with furfural, or a homologue thereof.

Another object of our invention is to produce useful products by the reaction of a diolefin with furfural, or a homologue thereof in the presence of water.

Still another object of our invention is to produce polycyclic aldehydes.

Still another object of our invention is to produce polycyclic lactones.

A further object of our invention is to produce useful products from the inter-reaction of a butadiene and a furfural in the presence of water.

Other objects and advantages of our invention will become apparent, to one skilled in the art, from the accompanying disclosure and discussion.

Fig. 1 of the drawings illustrates graphically the yield of "polymer," or reaction product, produced from furfural and 1,3-butadiene using amounts of butadiene varying from 5 to 50 weight per cent of the monomer charge. The yield is expressed as parts by weight per 100 parts of furfural charged to the reaction zone.

Figure 2:
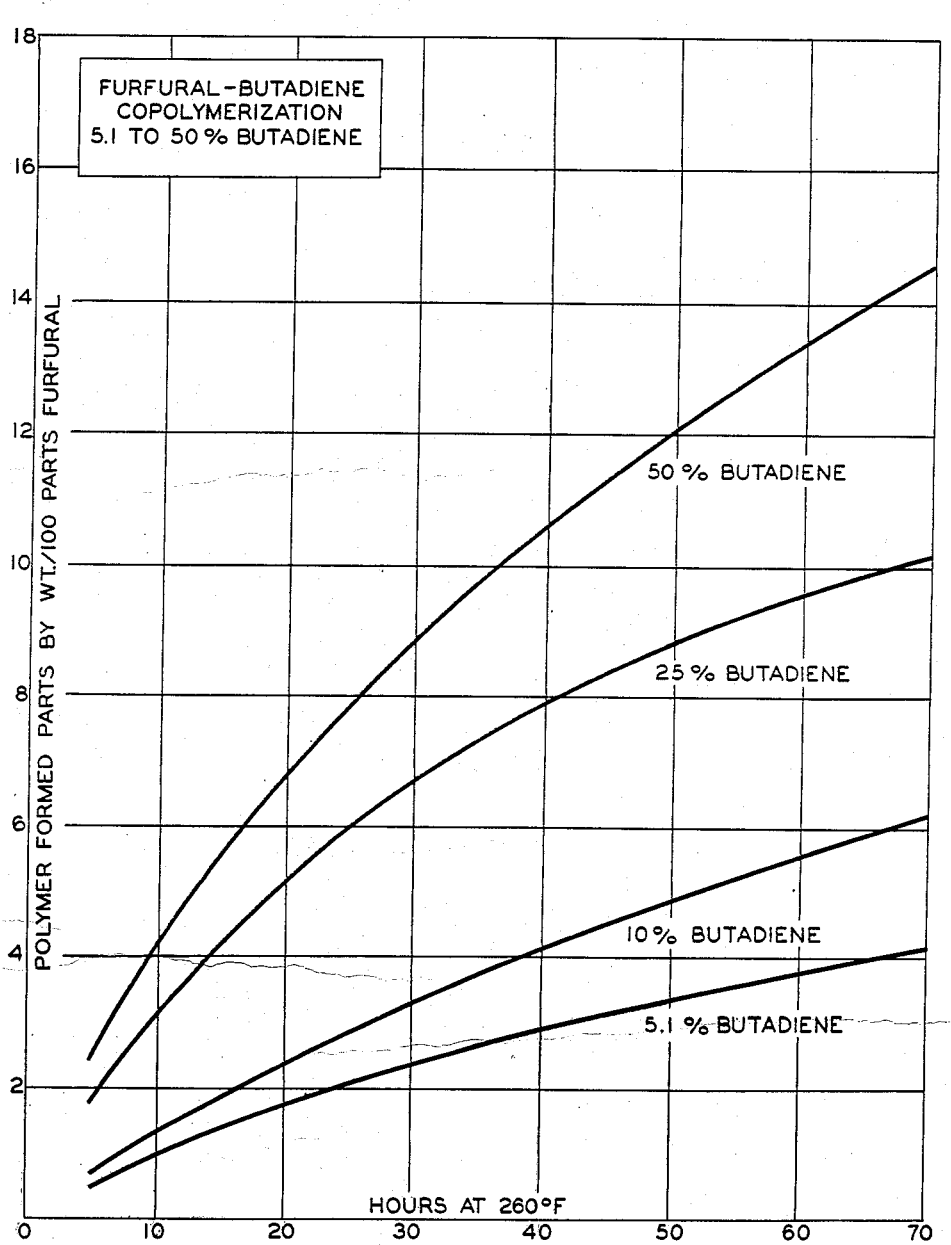

Fig. 2 of the drawings illustrates graphically the effect of reaction time on the "polymer," or reaction product, yield obtained from 1,3-butadiene and furfural in varying proportions. Yield is expressed as parts by weight per 100 parts of furfural charged to the reaction zone.

Fig. 3 of the drawings illustrates possible reaction products which might be obtained from 1,3-butadiene and furfural to produce a polycyclic aldehyde. The probabilities of these various reactions is discussed in greater detail hereinafter in connection with Example III.

As a diolefin reactant in our process, we prefer to use a conjugated diolefin, preferably a conjugated diolefin having not more than about seven carbon atoms per molecule. Such a diolefin can be referred to as a member of the group consisting of 1,3-butadiene and its immediate homologues and may be reported as having the formula

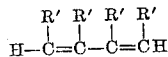

where each R' is of the group consisting of hydrogen and an alkyl group having not more than three carbon atoms and at least two R' are hydrogen. The furfural reactant employed in the practice of our invention can be referred to as one of the group consisting of furfural and its immediate homologues having not more than seven carbon atoms per molecule. Such a material may be said to be a compound having the formula

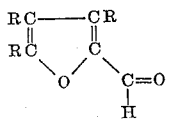

where each R is of the group consisting of hydrogen and methyl and at least one R is hydrogen. The more commonly used reactants are 1,3-butadiene and furfural, isoprene and furfural, and piperylene and furfural, and the corresponding diolefins with methyl furfural. It appears that in producing an aldehyde reaction product, two molecules of the diolefin react with one molecule of the furfural reactant by a modification of the Diels-Alder reaction. Also produced are lactones, resulting from union of one molecule of the diolefin with one molecule of the furfural and with one molecule of water.

As will be discussed in more detail hereinafter, the aldehyde reaction products include compounds having the empirical formula $$R_xR'_yC_{13}H_{16-(x+y)}O_2$$

where $x$ is an integer not greater than 2 and $y$ is an integer not greater than 4. These aldehydes probably have the following structural formula

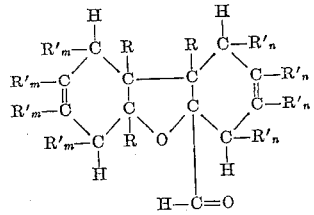

where each R is of the group consisting of hydrogen and methyl and at least one is hydrogen, and each R' is of the group consisting of hydrogen and an alkyl group having not more than three carbon atoms with the sum of the carbon atoms in the R'$_m$ and in the R'$_n$ in each case, not greater than three and at least two of the R'$_m$ and of the R'$_n$ are hydrogen.

The lactone reaction products include compounds having the empirical formula $$C_9H_{12}O_3$$

A preferred mode of operation of our invention may be illustrated with a reaction system comprising furfural of approximately five per cent water content by weight and butadiene in concentrations from three to fifty per cent by weight. The system is charged to an autoclave and maintained at temperatures within the range of from about 200° F. to about 300° F. for from about 5 to about 100 hours. The reactant product is then removed, unchanged reactants stripped off, and the higher boiling portion fractionated under reduced pressure. Butadiene dimer, which may also be formed in an appreciable amount when temperature and butadiene concentrations are sufficiently high, distills at 97° F. under an absolute pressure of 23 mm. of mercury and is removed in the stripping process. Our novel products are contained in the fraction distilling from about 150° F. to about 320° F. under an absolute pressure of about one mm. of mercury, which corresponds to about 450 to about 700° F. when converted to boiling temperatures at 760 mm. of mercury absolute. The major fraction of this material distills overhead between 190 and 275° F., under one mm. of mercury pressure.

While the above mentioned ranges of temperature, water content, and diolefin concentration represent conditions under which we generally prefer to operate in the production of our unique compositions, they are not to be construed as limiting in nature, in all instances. Obviously a certain interdependence exists among these variables such as for example, where it is desired to reduce operational time, the temperature, diolefin concentration, or both, should be increased. In general, alteration of any variable will usually require corresponding adjustments in one or more of the interdependent variables if efficient operation is to be maintained.

Pressures are, in general, not critical and while effective conversion is usually obtained at the pressures normally generated at the operating temperature, they may be varied to any desired level such as by admission of nitrogen or other inert gas. It is preferred to have the reactants present in the reaction zone primarily in liquid phase.

The water content of the furfural used in some commercial extractive distillation units, such as those operating on butylene-butadiene separation, is usually about five weight per cent. Although anhydrous furfural may be successfully employed to produce the polycyclic aldehyde, the presence of water in furfural, particularly at a concentration near this value, is not detrimental to the operation of this embodiment of our invention. In fact, water appears to have some catalytic effect on the reaction of butadiene with furfural to produce our novel aldehyde product and enters into the reaction which produces the lactone. However, water present in furfural in a concentration exceeding from 10 to 20 per cent often accelerates a secondary condensation to form undesirable tarry substances which contaminate the aldehyde product, reducing its yield. When water is present in the butadiene-furfural reaction mixture lactone type compounds, having the empirical formula as discussed hereinabove, are formed as an additional product.

High temperatures, above about 300° F., may also accelerate such secondary condensations as already described and should be avoided. While a good quality product can be obtained at relatively low temperatures, operations below about 160° F. usually require substantially extended time.

The reaction appears to take place catalytically as well as non-catalytically. Thus when employing commercially available reactants it has been found that various cuprous salts in minor quantities tend to act as inhibitors, as discussed in some detail in our copending application Serial No. 636,283, filed December 20, 1945, now U. S. Patent 2,475,094, issued July 5, 1949. However, we have also found that greater quantities of these materials have an opposite effect and actually promote the reactions. Other inhibiting agents include mercaptobenzothiazole, as disclosed in our copending application Serial No. 624,048, filed October 23, 1945, now U. S. Patent 2,473,750, issued June 21, 1949. Water and acids, both organic and inorganic, also tend to have catalytic influence on the reactions.

Distillation of the product under reduced pressure is preferred, usually below five mm. of mercury absolute, since substantial losses through secondary condensations, pyrolytic decomposition and the like usually result from the higher temperatures required for fractionation at atmospheric pressure.

The curves shown in the drawings are based upon the data obtained by carrying out the reaction between furfural containing about five per cent water by weight and substantially pure 1,3-butadiene. The butadiene concentration is expressed in terms of weight per cent of the total reaction mixture. The "copolymer," or reaction product, is expressed in terms of weight per cent of the furfural charged to the system.

The effect of varying concentrations of butadiene in the monomer charge is shown in Fig. 1. While increased concentration gives an almost proportional increase in production of our polymeric product, there is a substantial formation of butadiene dimer with higher concentrations and this generally constitutes a limiting factor due to economic considerations, usually at or below about 50 per cent butadiene by weight.

The relation of time to conversion rate is shown in Fig. 2. Depletion of butadiene beyond about 45 hours is sufficiently great to reduce the apparent rate of conversion and constitutents an influencing factor in time of operation.

By the methods of our invention we are able to obtain ultimate yields of our product amounting to 80 per cent or more by weight based on furfural reacted.

The following examples illustrate various factors influencing the reaction products produced in major amounts. While these examples include only the reaction of 1,3-butadiene with furfural, it is to be understood that these are considered to be typical reactions and reaction products, illustrating the generic feature of our invention as elsewhere discussed herein. In these examples, and in other discussion herein, boiling temperatures at subatmospheric pressures have been converted to boiling temperatures at an absolute pressure of 760 mm. of mercury in accordance with Ind. Eng. Chem., vol. 38, page 322 (1946).

EXAMPLE I

A mixture of freshly steam distilled, new furfural containing 4.6 weight per cent butadiene and 5.0 weight per cent water was reacted in steel bombs at 260° F. for a period of 96 hours. This material was transferred to a flask fitted with a Vigreux column and distilled under vacuum. The data obtained during this distillation are noted below in Table I.

*Table I*

DISTILLATION DATA ON SAMPLE I

| Fraction | Volume Distilled, cc. | Overhead Temperature, °F. | Pressure, mm. Hg | Boiling Point, °F., at 760 mm. | Overhead Product Grams | Percent |
|---|---|---|---|---|---|---|
| 1 | 7.0 | 78 | 25 | 245 | 546.0 | 93.6 |
|   | 20.0 | 84 | 5 | 310 |  |  |
|   | 50.0 | 121 | 6 | 350 |  |  |
|   | 450.0 | 120 | 5 | 355 |  |  |
|   | 475.0 | 180 | 5 | 430 |  |  |
|   | F. D. | 258 | 5 | 530 |  |  |
| 2 | 4.0 | 268 | 5 | 542 | 12.2 | 2.1 |
|   | 10.8 | 274 | 5 | 550 |  |  |
| 3 | F. D. | 293 | 5 | 575 | 7.8 | 1.3 |
|   | 7.0 | 295 | 5 | 580 |  |  |
| 4 | F. D. | 284 | 4 | 575 | 1.1 | 0.2 |
|   | 1.0 | 284 | 4 | 575 |  |  |
| Residue |  |  |  |  | 16.0 | 2.7 |

Fraction 1 comprises the furfural, any oils, and butadiene dimer. Fraction 2 is considered to contain primarily the light "polymer," or reaction product and also contains some furfural. It had a specific gravity at 80° F. of 1.131 and a refractive index measured at 68° F. of 1.5283. Fraction 3 was dark in color, had a specific gravity of 1.11 and on standing turned very dark in a few hours. Fraction 2 is discussed further hereinafter. This distillation was discontinued before the high boiling or heavy "polymer" was distilled overhead.

EXAMPLE II

Freshly steam distilled furfural containing five per cent by weight of water was charged to a steel reaction vessel. Sufficient 1,3-butadiene was added to give a butadiene concentration of 4.0 per cent in the reaction mixture. The composition of the charge material was

| | Parts by weight |
|---|---|
| Furfural | 91.2 |
| Butadiene | 4.0 |
| Water | 4.8 |

The temperature within the reaction vessel was maintained at 260° F. for 70 hours. The reaction product was then transferred to a specially designed distilling flask and stripped of water and unreacted furfural and butadiene under a pressure of from two to five mm. of mercury. A residue containing some furfural and the furfural-butadiene condensation products was transferred to a flask bearing a Vigreux column and fractionated at pressures in the range 0.5–0.2 mm. of mercury. The data observed during this distillation are tabulated in Table II below:

Table II

| Cut No. | Kettle Temp., °F. | Press., mm. Hg | O. H. Temp., °F. | Corrected O. H. Temp., °F. | Product Distilled cc. | Product Distilled gms. | Sp. Gr. at 25° C. | Refractive Index at 20° C. |
|---|---|---|---|---|---|---|---|---|
| 1 | 113 | 1.5 | 99 | 370 | 5.0 | | | |
| 1 | 116 | 1.5 | 101 | 375 | 10.0 | | | |
| 1 | 116 | 1.5 | 99 | 370 | 20.0 | | | |
| 1 | 119 | 1.5 | 103 | 380 | 30.0 | | | |
| 1 | 116 | 1.5 | 96 | 368 | 40.0 | | | |
| 1 | 121 | 1.5 | 102 | 380 | 50.0 | | | |
| 1 | 127 | 2.0 | 105 | 372 | 60.0 | | | |
| 1 | 129 | 2.0 | 106 | 373 | 70.0 | | | |
| 1 | 142 | 2.0 | 105 | 372 | 90.0 | | | |
| 1 | 160 | 2.0 | 105 | 372 | 99.0 | 114.1 | 1.152 | 1.5254 |
| 2 | 220 | 2.0 | 105 | 372 | 6.0 | | | |
| 2 | 220 | 1.0 | 105 | 390 | 8.0 | | | |
| 2 | 230 | 1.0 | 146 | 440 | 9.0 | 10.2 | | |
| 2 | 226 | 2.0 | 175 | 460 | 0.0 | | | |
| 3 | 234 | 2.0 | 190 | 480 | 1.0 | | | |
| 3 | 236 | 2.0 | 200 | 490 | 2.5 | | | |
| 3 | 238 | 2.0 | 206 | 500 | 3.2 | | | |
| 3 | 248 | 2.0 | 219 | 516 | 4.4 | | | |
| 3 | 242 | 1.8 | 213 | 513 | 5.2 | | | |
| 3 | 258 | 2.0 | 222 | 522 | 10.0 | 11.17 | 1.117 | 1.5276 |
| 3 | 256 | 1.0 | 218 | 545 | 0.0 | | | |
| 4 | 256 | 1.0 | 225 | 555 | 10.0 | 11.13 | 1.113 | 1.5265 |
| 4 | 256 | 1.0 | 225 | 555 | 0.0 | | | |
| 5 | 320 | 0.5 | 255 | 625 | 10.0 | 11.21 | 1.121 | 1.5265 |
| 5 | 325 | 0.5 | 260 | 630 | 0.0 | | | |
| 6 | 342 | 0.5 | 270 | 645 | | 2.81 | | |
| 6 | | | | | | 16.0 | | |
| Residue | | | | | | | | |

In the above distillation, fraction 1 comprises recovered furfural. Fraction 2 represents the transition between furfural and the light reaction product and is a mixture of the two. Fraction 3 was an amber colored liquid and is typical of the light reaction product or "polymer." The first few milliliters of this fraction were slightly low-boiling and were probably contaminated with a little furfural. Fraction 4 can be regarded as the heart-cut of the light reaction product. Fraction 5 is similar to fraction 4. Fraction 6 comprised the so-called heavy "polymer," or reaction product. It consisted of a mixture of white crystals and a red viscous liquid. The white crystals which appeared in fraction 6 had a melting point (crude) of 245° F. to 250° F., a melting point after crystallization of 276° F. and an acidity of 0.0 per cent, an aldehyde content of 0.0 per cent, and a molecular weight of about 189. They were insoluble in pentane and soluble in acetone, water, benzene, methanol, cyclohexane and carbon disulfide. The residue was very dark material resembling coke and was not distillable. Both in this case and in the previous fractionations attempts to distill this material at pressures of 0.5 mm. of mercury resulted in decomposition. Fractions 3 through 6 and the residue may be considered to be the total "polymer" or reaction product isolated from this distillation. On this basis approximately 65 per cent of the total reaction product formed was the amber colored liquid designated as light reaction product. Approximately four per cent of the total product distilled in a higher range and the remainder or thirty-one per cent of the total product formed, was coke. Light products are defined as that material boiling above the furfural plateaus and distilling below 260° F. at 0.5 mm. of mercury, which corresponds to 630° F. at 760 mm. of mercury. Heavy product is defined as that distilling above 260° F. at 0.5 mm. of mercury, and coke as that portion not distillable without decomposition under the pressures of 0.5 mm. or above.

The data given in Examples I and II on the nature of the reaction product indicates that the light reaction product, which makes up the bulk of the material formed, falls essentially on a plateau that appears to have the characteristics of a single chemical compound. In addition the heavier fraction appeared to contain one and possibly two other individual chemical compounds. The white crystals obtained in this higher boiling fraction represent another probable chemical entity and it seems likely that the red oil which distills within a relatively narrow range at this point is also another compound or group of compounds. Since material balances have fairly well established that two mols of butadiene condense with one mol of furfural to produce this low boiling polymer, and it has been isolated in relatively large quantities, an attempt was made to determine its chemical nature.

Some early tests on samples of this material isolated in small quantities indicated that it had a molecular weight of approximately 200 or a little more, and that it apparently contained considerable free aldehydes. Specific investigation of the samples of relatively pure materials was carried out on the products of distillation of Examples I and II. In Example I, fraction 2, which had a boiling range corrected to 760 mm.

pressure of 530–550° F., was selected as typical of the light reaction product and subjected to further study. Molecular weight determinations by lowering of the freezing point of benzene yielded a value of 207. A carbon and hydrogen analysis was made on this material by combustion. All material unaccounted for in this determination was assumed to be oxygen. Results of the analysis were: 75.0 weight per cent carbon; 8.1 weight per cent hydrogen; and 16.9 weight per cent oxygen (by difference). On the basis of a molecular weight of 207, the empirical formula was calculated to be $C_{12.9}H_{16.6}O_{2.2}$. Titration of the material with standard sodium hydroxide in methanol solution using phenolphthalein indicator showed a slight acidity. This calculated to be 3.07 weight per cent as furoic acid. A portion of the material was analyzed for the presence of an active aldehyde group by treatment with hydroxylamine hydrochloride reagent. On the basis of a molecular weight of 207, the material calculated to be 70.3 weight per cent aldehydes. Fraction No. 3 which boiled at somewhat higher temperature and turned dark on standing was subjected to molecular weight determination and a value of 223 was obtained.

In Example II the first sample examined was fraction No. 3. This material had an initial boiling point, corrected to 760 mm., of 460° F. However, the portion from 35 per cent to 100 per cent overhead boiled within the range of about 510–522° F. (corrected). It should be noted at this point that reading of pressures on the simple mercury manometer was not accurate to better than 0.5 mm. and this affects considerably the correction of observed temperatures to 760 mm. Analysis of fraction 3 by the hydroxylamine hydrochloride reagent showed aldehyde content of 80.0 per cent. The fraction was subjected to crystallization in pentane solutions at temperatures of −112° F. After two recrystallizations at this temperature, the crystals were examined. The properties determined in the usual molecular weight, carbon and hydrogen, aldehydes, and physical property tests are tabulated below.

| | |
|---|---|
| Specific gravity | 1.10 at 77° F. |
| Refractive index | 1.5254 at 68° F. |
| Molecular weight | 210. |
| Empirical formula (from carbon and hydrogen analysis) | $C_{13.3}H_{17.1}O_{2.0}$. |
| Aldehyde content | 99.0%. |

Similar determinations were carried out on fraction 4, which had an apparent boiling range of 545–555° F. corrected to 760 mm. pressure. The same statement with regard to the pressure-temperature correction applies in this case. The results of tests made on this material are listed in the following tabulation:

| | |
|---|---|
| Specific gravity | 1.13 at 68° F. |
| Refractive index | 1.5265 at 68° F. |
| Molecular weight | 208. |
| Acidity | 0.82% (calculated as furoic acid). |
| Aldehyde content | 83.5%. |

It will be seen that this material resembles very closely the material purified from fraction 3 by the low temperature crystallization.

Fraction No. 5 was simarily examined and as shown in the earlier table, its refractive index and gravity showed it to be essentially the same as fraction No. 4. The material was reacted with sodium bisulfite solution and the free aldehydes liberated from it with dilute acid. Although a typical crystalline aldehyde addition product formed, this method of purification was not suitable for the small amount of material available. Tests were made on the higher boiling material in fraction No. 6. Information on the results of this investigation are given in a subsequent section.

The molecular weight and empirical formulas determined for these fractions confirm the earlier estimates for material balances that the product consists of the condensation product of two mols of butadiene and one of furfural. It shows also the rather surprising result that a free aldehyde group is still present in the molecule, and that very little acid has been formed.

Consideration of the chemical nature of the compounds involved made it seem likely that a Diels-Alder type condensation was occurring in which the olefinic bonds of furfural were sufficiently activated by the presence of the aldehyde group to allow condensation in this manner with the butadiene. Although it is not too surprising that this occurred on the 2,3 position it did seem unusual that this condensation would also occur in the 4,5 position. Compounds formed by this mechanism would have the empirical formula $C_{13}H_{16}O_2$ and a molecular weight of 204, which agrees closely with the values obtained in the study of the light reaction products. It is also conceivable that after condensation of the first molecule of butadiene with the 2,3 position on the furfural, the second mol of butadiene might condense with the six-membered ring so formed. Or, the first condensation, following the unlikely course of condensation with the 4,5 position might then result in a product which would undergo further condensation with this six-membered ring. These products were considered less likely than the first mentioned condensation product. It was also surprising that the intermediate product resulting from the condensation of the first mol of butadiene and furfural was not found. Although it would be expected to have a lower boiling point, it should be distinctly higher than that of furfural and butadiene dimer and appear in appreciable quantity. No indication of any more than trace amounts of an intermediate compound have been found.

The material has been substantially characterized by its physical properties and has been clearly shown to be an aldehyde by means of the production of the crystalline sodium bisulfite compound, and the formation of an oxime, small portions of which were separated as crystalline material during the course of studies on the titration with hydroxylamine reagent. A sufficient quantity of the copolymer was prepared to enable isolation of the pure compound, and preparation and isolation of a number of its derivatives to complete the identification, particularly to aid in the choice between the possible formulas.

EXAMPLE III

To the above end several large portions of the light reaction product were prepared by reaction in large steel bombs in a new apparatus constructed especially for the purpose. The operations were carried out at 260° F. for periods of approximately 100 hours and the materials were isolated from the excess furfural. When sufficient had been obtained the product was distilled.

Two fractions were prepared and subjected to study. The first, comprising about 100 cc. of the light reaction product of very narrow boiling range is identified as preparation A. The second comprising about 250 cc. of product boiling over somewhat greater range (220–260° F. 0.5–1.0 mm.) was identified as preparation B. Both these materials were insoluble in water, dilute sodium hydroxide, and dilute hydrochloric acid solutions. They were decomposed by concentrated sulfuric acids. Both absorbed bromine, reacted with sodium bisulfite and hydroxylamine, and on heating with strong acids or alkalis did not form resins.

These two fractions were redistilled in a small silvered laboratory column constructed especially for the close fractionation of small amounts of material. From the close boiling fraction A, a distillate from 1 per cent to 90 per cent overhead was collected at a temperature of 239.0° F. at 1.1 mm. of pressure. A sample of B was also fractionated in the same still. A slightly larger initial fraction was discarded, but the amount boiling from about 10 to 85 per cent had precisely the same distillation temperature as the fraction obtained from sample A. These overhead fractions were pale yellow liquids having the following properties and analysis:

Boiling point, 760 mm. ---- 584.6° F.
Specific gravity, $d_{68}^{68}$ ---- 1.120.
Refractive index, $n_4^{68}$ ---- 1.5240.
Iodine number ---- 253.
Acetyl number ---- 0.
Solubility:
  Water ---- Insoluble.
  Dilute NaOH ---- Insoluble.
  Dilute HCl ---- Insoluble.
  Concentrated $H_2SO_4$ ---- Decomposes.
Qualitative tests:
  Flammability ---- Positive.
  Bromine absorption ---- Positive.
  Tollen's reagent ---- Positive.
  Heating with strong acid or alkali ---- No resin formation.

Analysis:

| | Found | Calc'd for $C_{13}H_{16}O_2$ |
|---|---|---|
| Carbon, percent | 76.10 | 76.45 |
| Hydrogen, percent | 8.03 | 7.84 |
| Molecular weight | 205 | 204 |

This material was then used for the preparation of derivatives. Since the oxime had been noted in the earlier tests with hydroxylamine hydrochloride it was prepared, isolated and purified. The compound was white, had a melting point of 206.5–207.5° F. The analysis of the product was: carbon, 71.46 per cent; hydrogen, 7.88 per cent; and nitrogen 6.51 per cent. Calculated values for the oxime $C_{13}H_{17}O_2N$ are: carbon, 71.2; hydrogen, 7.82; and nitrogen, 6.38. The sodium bisulfite addition product was also prepared, crystallized, separated from solution and recrystallized.

These two derivatives served to characterize the material as an aldehyde, $C_{13}H_{16}O_2$. Two additional derivatives were prepared. The 2,4-dinitrophenyl hydrazone was made by a standard reaction. This compound was a yellow, crystalline derivative melting at 307–308° F. It analyzed carbon, 59.35; hydrogen, 5.37; and nitrogen, 14.3. Calculated values for the product $C_{19}H_{20}O_5N_4$ are carbon, 59.3; hydrogen, 5.25; and nitrogen, 14.68. The material was also oxidized with alkaline silver oxide, and yielded white crystals of an acid. This compound melted at 195–196° F. analyzed: carbon, 71.01; hydrogen, 7.55; against a calculated value of $C_{13}H_{16}O_3$ of carbon 70.90, and hydrogen 7.27.

The fraction from which this material was isolated by further laboratory distillation was an essentially pure compound. The fraction boiling above 85 or 90 per cent respectively represented for the most part column holdup rather than high boiling residue.

The possible courses of reaction are indicated in the structural formula given in Fig. 3.

Furfural may first react with 1 mol of butadiene according to either reaction (1) or (2) to form the products (A) or (B), depending upon which side of the molecule first reacts. Product (A) is believed most likely. A third possible course of the reaction is indicated by the dotted arrow in reaction (3). Condensation across the oxygen atom is known to occur between furan and ethylene, but the resulting product with butadiene, having the 7 membered oxygen-containing ring fused to the 5 membered oxygen-containing ring seems highly improbable from structural standpoints. Either product (A) or product (B) of the 1 to 1 mol condensation may then react with a second mol of butadiene by reaction (5) or (6) respectively, to yield a product (II) containing the furan nucleus in the middle of the three-ring condensate. The reaction of butadiene to form dimer indicates that it may behave as a diene or as a monoolefin condensing essentially with itself so that formation of products (I) and (III) by the reaction (4) from intermediate A or reaction (7) from intermediate B is also possible. Both compound (I) and compound (III) would be expected to undergo resinification with acid, or particularly, with alkali heating treatment. Since no such resinification was observed, it appears that Formula II is the correct one. This compound may be named 2,3-4,5-bis($\Delta^2$-butenylene)-tetrahydrofurfural.

EXAMPLE IV

In the preparation of the large quantities of the low boiling reaction product, a relatively large amount of the high boiling fraction was also obtained. This material was a reddish oil containing some crystals. After standing for a period of months, the material contained a considerable portion of crystals. Fourteen grams of this material boiling at 260–290° F. at 0.5 mm. was redistilled at 0.5 mm. in a 6-inch packed, silvered column. Approximately 1.0 gram of the light reaction product was separated followed by 2.0 grams of a white crystalline solid. The remaining overhead product was a heavy oil. The residue was transferred to a very small flask, but no further crystalline products could be distilled and no crystals separated from the oily overhead material.

The crystalline material was found to melt at 267–268° F. It had a neutralization equivalent of 192. An initial determination of the molecular weight, determined in benzene by the freezing point, was 180, though difficulty was experienced with low solubility. Determination by the Rast camphor method gave a value of 158. The material is soluble in water, alcohol, and dilute sodium hydroxide solution. Preliminary carbon and hydrogen analyses gave C, 64.18%; H 7.33%; and O, difference 28.44%. The neutralization equivalent indicates the presence of one potential carboxyl group per molecule.

Further experimental work, described in Examples V and VI of this specification, was undertaken to identify this crystalline material more accurately.

EXAMPLE V

White crystalline product from the reaction of furfural with 1,3-butadiene and water, of the type described in Example IV, after purification by sublimation, had a melting point of 276° F. A mixed melting point taken with furoic acid was 221 to 250° F. showing that the product was not furoic acid. The neutral equivalent was 163.5 and the molecular weight was 158 by benzene freezing point lowering. The bromine number was 86 gms./100 gms.

By tests which were carried out, it was established that the crystalline product is non-aldehydic, is not a ketone, contains no free carboxy group, and does not react to phenol tests. The cold water solution neutralizes sodium hydroxide slowly and reacts more rapidly when heated. It dissolves slowly in sodium bicarbonate solution upon standing. Hydrolysis of the compound does not give two fragments which precludes the possibility of its being an ester. Thus it is established that a lactone group must be present. Isolation of a pure sample of the hydrolysis product was impossible, a further proof of the lactone structure, it being well known that the hydrolysis products of lactones are usually unstable except in solution.

Carbon-hydrogen analyses indicated an empirical formula of $C_3H_4O$, and, based on the molecular weight data, a molecular formula of $C_9H_{12}O_3$. It should be noted that the summation of the atoms of butadiene, furfural and water is also $C_9H_{12}O_3$. By hydrogenation over a palladium catalyst, it was established that one and only one unsaturated linkage exists in the compound. Another sample of the material was reacted with acetic anhydride to form an ester, thereby establishing the presence of a hydroxyl group. Dehydration of the compound with phosphoric acid gave good yields of phenyl propionic acid.

EXAMPLE VI

Anhydrous furfural containing 3.6 weight per cent butadiene was maintained in a closed reaction vessel under a pressure of from 25 p. s. i. g., at 260° F. for 72 hours. The resulting reaction mixture was distilled under vacuum at one mm. of mercury until a kettle temperature of 212° F. was reached, to remove unreacted furfural and butadiene, butadiene dimer and any other low-boiling materials. Unreacted butadiene amounting to 1.2 weight per cent of the original butadiene-furfural charge (33⅓ per cent of butadiene originally charged) was recovered as an overhead distillation product. Butadiene-furfural condensate product amounting to 3.2 weight per cent of the original furfural-butadiene charge, and contaminated with a trace quantity of furfural polymer, was recovered as distillation kettle product.

EXAMPLE VII

A series of tests was made to determine the effect of such variables as water concentration, contact time and temperature on the ratio of light product to heavy product and coke formed.

The effect of water concentration on the type of product formed was studied by reacting approximately 400 cc. of steam distilled new furfural in steel bombs at 260° F. with the addition of various percentages of water. After the material had been reacted the desired length of time, it was transferred to a laboratory column and fractionated at reduced pressure. A division between light and heavy products was made as above stated at 260° F. and 0.5 mm. of mercury. The results of this test are tabulated below in Table IV.

Table IV

EFFECT OF WATER CONCENTRATION ON TYPE OF REACTION PRODUCT

| Concentration in Reactor Charge | | Hours at 260° F. | Product Formed | |
|---|---|---|---|---|
| Water, Wt. Percent | Butadiene, Wt. Percent | | Light Product, Wt. Percent | Heavy Product, Wt. Percent |
| 3.8 | 4.9 | 70 | 72 | 28 |
| 29.0 | 4.6 | 70 | 48.5 | 51.5 |

As water concentration was increased from 3.8 to the very high level of 29 per cent, the ratio of light product to heavy product and coke formed was decreased very markedly.

EXAMPLE VIII

The effect of length of contact time on the ratio of light to heavy product was studied in the same manner described above. The original furfural used in this study contained 4.0 per cent water in all cases. Samples were run for periods varying from 30 to 120 hours at 260° F. The results of the study are tabulated below in Table V.

Table V

EFFECT OF CONTACT TIME ON TYPE OF REACTION PRODUCT

| Hours at 260° F. | Concentration of Butadiene in reactor Charge, Wt. Percent | Products Formed | |
|---|---|---|---|
| | | Light Products, Wt. Percent | Heavy Products, Wt. Percent |
| 30 | 4.0 | 74.0 | 26.0 |
| 70 | 4.9 | 72.2 | 27.8 |
| 96 | 4.6 | 56.8 | 43.2 |
| 120 | 4.5 | 48.0 | 52.0 |

As might possibly be expected, longer contact times in steel bombs at the elevated temperature appeared to increase the relative amount of heavier product and coke formed with a corresponding decrease in the light product recovered. Further reaction of the original light product would, of course, produce this effect.

Similar studies were made of the reaction product obtained from runs made at 230 and 260° F., respectively, with varying amounts of the butadiene in which the reaction products, butadiene dimer, and unreacted butadiene were determined. In the run at 230° F. the total product from the bomb having an initial butadiene content of 25.0 per cent was distilled after the 70 hour reaction period. The distillation indicated 5.6 weight per cent of heavy product and 94.4 per cent of the desired light product. In the run at 260° F., distillation of the product from the initial charge containing 25 per cent butadiene after 70 hours yielded a final product containing 18.8 per cent heavy product and coke and 81.2 per cent light product. The products from the charge containing an initial 50 per cent butadiene on the other hand, analyzed 75.3 weight per cent light product and 24.7 per cent heavy product and coke. The indications derived from these three distillations is that a greater proportion of the total reaction product produced is in the desired light range when operating at lower temperatures and that excessive amounts of butadiene tend to increase the amount of heavy product and coke somewhat. However, the concentration of 25 per cent butadiene is relatively high and it will be noted that at both temperatures studied a large proportion of the material produced was in the desired boiling range.

EXAMPLE IX

Three parallel experiments were carried out employing conditions similar to those of Example II. Butadiene was added in a concentration of 9.7 per cent by weight of the total charge. The reaction vessels were opened at the end of 20, 47 and 70 hours, respectively, the contents removed, stripped of butadiene dimer and unchanged reactants and fractionated under reduced pressure to remove the small quantities of high boiling tarry material formed. Yields of the yellow light oil, in parts by weight per 100 parts of butadiene charged, were as follows:

| Time | Yield |
|---|---|
| 20 hours | 15.2 |
| 47 hours | 30.0 |
| 70 hours | 37.0 |

The yields of purified product, as parts by weight per 100 parts of the total initial charge, were as follows:

| | |
|---|---|
| 20 hours | 1.48 |
| 70 hours | 3.59 |

The yields of the purified product obtained at 20 and 70 hours were 85 weight per cent and 75 weight per cent, respectively, of the total unpurified product which was recovered.

EXAMPLE X

Three experiments similar to those of Examples II and IX were carried out employing 25 parts by weight of butadiene per 100 parts of total charge. Reaction times were 20, 46.5 and 70 hours. The butadiene dimer was separated by stripping and fractionation under reduced pressure was carried out as before. Results of these experiments were as follows:

| Time, Hours at 260° F. | Desired Product, Parts by Wt. per 100 Parts of Butadiene Charged |
|---|---|
| 20 | 11.9 |
| 46.5 | 20.1 |
| 70 | 22.5 |

The yield of the desired product at 70 hours was 5.7 parts by weight per 100 parts of total charge to the reactor. Substantially all of the remaining butadiene was recovered unreacted or in the form of dimer.

EXAMPLE XI

A sample of furfural containing 5 weight per cent water and 10 weight per cent butadiene based on total reactor charge was heated in a steel reaction chamber for 70 hours at a temperature of 230° F. Unchanged reactants and butadiene dimer were stripped after which the higher boiling portion was fractionated under reduced pressure. A yield of 30.8 parts of purified product by weight per 100 parts of butadiene charged was obtained under these conditions. The weight of desired product was 95 per cent of the total weight of unpurified product obtained. Substantially all the remaining butadiene was recovered either as such or as the dimer.

It will be appreciated that many modifications and variations of our process may be made, based upon the disclosure and discussion contained herein, without departing from the spirit or scope thereof, and without departing from the scope of the claims.

We claim:

1. 2,3,4,5 - bis($\Delta^2$ - butenylene) - tetrahydrofurfural substantially free from other compounds formed during its preparation.

2. An aldehyde substantially free from other compounds formed during its preparation and having the formula

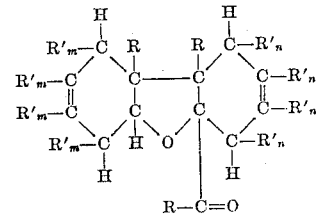

where each R is of the group consisting of hydrogen and methyl and at least one is hydrogen, and each R' is of the group consisting of hydrogen and an alkyl group having not more than three carbon atoms with the sum of the carbon atoms in the $R'_m$ and in the $R'_n$ in each case, not greater than three and at least two of the $R'_m$ and of the $R'_n$ are hydrogen.

3. A process for producing an aldehyde having the formula

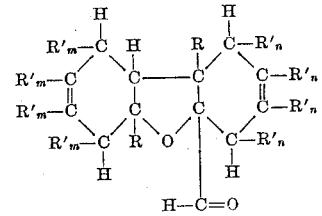

where each R is of the group consisting of hydrogen and methyl and at least one is hydrogen, and each R' is of the group consisting of hydrogen and an alkyl group having not more than three carbon atoms with the sum of the carbon atoms in the $R'_m$ and in the $R'_n$ in each case, not greater than three and at least two of the $R'_m$ and of the $R'_n$ are hydrogen, which comprises reacting a mixture consisting essentially of a furfural having not more than seven carbon atoms per molecule and the formula

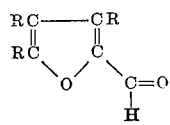

where each R is of the group consisting of hydrogen and methyl and at least one is hydrogen, and a conjugated diolefin hydrocarbon having not more than seven carbon atoms per molecule and the formula

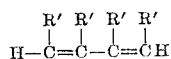

where each R' is of the group consisting of hydrogen and an alkyl group having not more than three carbon atoms and at least two are hydrogen, under reaction conditions such that two molecular proportions of said hydrocarbon react with one molecular proportion of aldehyde reactant, and recovering from effluents of said reaction a fraction comprising said aldehyde product.

4. A process for preparing

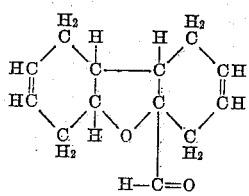

which comprises reacting a mixture consisting essentially of furfuraldehyde and 1,3-butadiene at a reaction temperature not greater than about 300° F., and recovering from products of said reaction an aldehyde fraction comprising said compound.

5. A process for the production of a reaction product of 1,3-butadiene and furfural, which comprises reacting a mixture consisting essentially of 1,3-butadiene and furfural, and recovering from effluents of said reacting a material comprising a polycyclic compound containing a furan ring and at least one six-membered carbocyclic ring and containing a carbonyl radical attached to a carbon atom of said furan ring adjacent the oxygen atom thereof.

6. The process of claim 5 in which said fraction recovered comprises an aldehyde having the empirical formula $C_{13}H_{16}O_2$.

7. A process for the production of a reaction product of a conjugated diolefin and a furfural, which comprises reacting a mixture consisting essentially of a conjugated diolefin having not more than seven carbon atoms per molecule and the formula

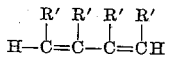

where each R' is of the group consisting of hydrogen and an alkyl group having not more than three carbon atoms per molecule and at least two are hydrogen, and a furfural having not more than seven carbon atoms per molecule and the formula

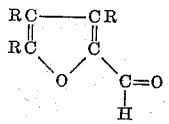

where each R is of the group consisting of hydrogen and methyl and at least one is hydrogen, and recovering from effluents of said reacting a product fraction comprising a polycyclic compound containing a furan ring and at least one six membered carbocyclic ring and containing a carbonyl radical attached to a carbon atom of said furan ring adjacent the oxygen atom thereof.

8. The process of claim 7 in which said product fraction comprises an aldehyde having the empirical formula

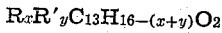

where each $x$ is an integer not greater than 2 and each $y$ is an integer not greater than 4.

9. A process for the production of a reaction product of 1,3-butadiene and furfural, which comprises causing 1,3-butadiene to interact with furfural in the absence of a catalyst and at a temperature in the range of 160 to 300° F., said furfural containing water in a concentration below 10 per cent by weight, the total concentration of butadiene in the reaction system being in the range of from about 3 to about 50 per cent by weight, and recovering from effluents of said reaction a material comprising a polycyclic compound containing a furan ring and at least one six-membered carbocyclic ring and containing a carbonyl radical attached to a carbon atom of said furan ring adjacent the oxygen atom thereof.

10. A process for the production of a reaction product of a conjugated diolefin and a furfural, which comprises causing a conjugated diolefin having not more than 7 carbon atoms per molecule and the formula

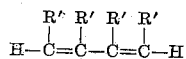

where each R' is of the group consisting of hydrogen and an alkyl group having not more than three carbon atoms per molecule and at least two are hydrogen, to interact with a furfural having not more than seven carbon atoms per molecule and the formula

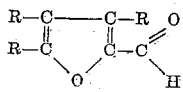

where each R is of the group consisting of hydrogen and methyl and at least one is hydrogen, in the absence of a catalyst, and at a temperature in the range of 160 to 300° F., the said furfural containing water in a concentration below 10 per cent by weight, and recovering from effluents of said reaction a product fraction comprising a polycyclic compound containing a furan ring and at least one six-membered carbocyclic ring and containing a carbonyl radical attached to a carbon atom of said furan ring adjacent the oxygen atom thereof.

11. A process for the preparation of a normally liquid aldehydic reaction product containing both a six-membered ring made up wholly of carbon atoms and a five-membered oxygen-containing ring from 1,3-butadiene and furfural which comprises reacting a mixture comprising from 3 to 50 weight per cent 1,3-butadiene and from 50 to 97 weight per cent furfural at a temperature within the range of from about 200° F. to about 300° F. for a period of time within the range of from about 5 to about 100 hours, and recovering said normally liquid product from effluents of said reaction.

12. A process for the preparation of a normally liquid aldehyde containing both a six-membered ring made up wholly of carbon atoms and a five-membered oxygen-containing ring from 1,3-butadiene and furfural which comprises reacting a mixture comprising from 3 to 50 weight per cent 1,3-butadiene and from 50 to 97 weight per cent furfural at a temperature within the range of from about 200° F. to about 300° F., and recovering said normally liquid aldehyde from effluents of said reaction as a product of the process.

13. A process for the preparation of a normally liquid aldehyde material which comprises reacting a mixture consisting of from 3 to 50 weight per cent 1,3-butadiene and from 50–97 weight percent furfural containing approximately 5 weight per cent water at a temperature within the range of from about 200° F. to about 300° F., and recovering from effluents of said reaction a liquid aldehyde so produced.

14. The process of producing an aldehyde reaction product from 1,3-butadiene and furfural, which comprises reacting a mixture consisting essentially of 1,3-butadiene and furfural, and recovering from effluents of said reacting an aldehyde fraction having a boiling point within the range from about 200 to 320° F. at an absolute pressure of one millimeter of mercury, a refractive index at 25° C. within the range of about 1.520 to about 1.530 and a specific gravity at 20° C. within the range of about 1.08 to 1.16.

15. A process for the production of a reaction product of 1,3-butadiene and furfural, which comprises causing 1,3-butadiene to interact with furfural in the absence of a catalyst and at a temperature in the range of 160 to 300° F., said furfural containing water in a concentration below 10 per cent by weight, the total concentration of butadiene in the reaction system being in the range of from about 3 to about 50 per cent by weight, and recovering from effluents of said reaction a material comprising a polycyclic compound containing a furan ring and at least one six-membered carbocyclic ring and containing a carboxyl radical attached to a carbon atom of said furan ring adjacent the oxygen atom thereof, and recovering also from effluents of said reaction of lactone characterized by the empirical formula $C_9H_{12}O_3$ as an additional product of the process.

16. A process for the production of a reaction product of a conjugated diolefin and a furfural, which comprises reacting together a conjugated diolefin having not more than 7 carbon atoms per molcule and the formula

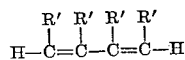

where each R' is of the group consisting of hydrogen and an alkyl group having not more than three carbon atoms per molecule and at least two are hydrogen, and a furfural having not more than seven carbon atoms per molecule and the formula

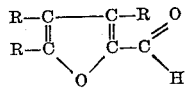

where each R is of the group consisting of hydrogen and methyl and at least one is hydrogen, in the absence of a catalyst, and at a temperature in the range of 160 to 300° F., the resulting reaction mixture containing water in a concentration below 10 per cent by weight based on furfural therein, and recovering from effluents of said reaction a product fraction comprising a polycyclic compound containing a furan ring and at least one six-membered carbocyclic ring and containing a carbonyl radical attached to a carbon atom of said furan ring adjacent the oxygen atom thereof, and recovering also from effluents of said reaction a lactone characterized by the empirical formula $C_9H_{12}O_3$ as an additional product of the process.

17. A process for the production of a reaction product of 1,3-butadiene and furfural, which comprises reacting 1,3-butadiene with furfural in the absence of a catalyst and at a temperature in the range of 160 to 300° F., said furfural containing water in a concentration below 10 per cent by weight, the total concentration of butadiene in the reaction system being in the range of from about 3 to about 50 per cent by weight, and recovering a lactone characterized by the empirical formula $C_9H_{12}O_3$ from effluents of said reacting as a product of the process.

18. A process for the production of a reaction product of a conjugated diolefin and a furfural, which comprises reacting a mixture consisting essentially of a conjugated diolefin having not more than 7 carbon atoms per molecule and the formula

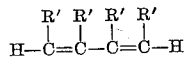

where each R' is of the group consisting of hydrogen and an alkyl group having not more than three carbon atoms per molecule and at least two are hydrogen, and a furfural having not more than seven carbon atoms per molcule and the formula

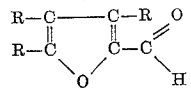

where each R is of the group consisting of hydrogen and methyl and at least one is hydrogen in the absence of a catalyst and at a temperature in the range of 160 to 300° F., the said furfural containing water in a concentration below 10 per cent by weight, and recovering a lactone characterized by the empirical formula $C_9H_{12}O_3$ from effluent of said reaction as a product of the process.

19. A lactone substantially free from other compounds formed during its preparation and having a composition illustrated by the empirical formula $C_9H_{12}O_3$ and prepared by the interreaction of butadiene with water and furfural at a temperature within the limits of 160 and 300° F.

20. A process for the production of a lactone from a conjugated diolefin, a furfural, and water, which comprises reacting a mixture consisting essentially of a conjugated diolefin having not more than 7 carbon atoms per molecule and the formula

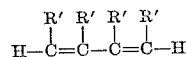

where each R' is of the group consisting of hydrogen and an alkyl group having not more than three carbon atoms per molecule and at least two are hydrogen, a furfural having not more than seven carbon atoms per molecule and the formula

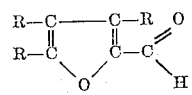

where each R is of the group consisting of hydrogen and methyl and at least one is hydrogen, and water, at a temperature in the range of 160 to 300° F., the resulting reaction mixture containing water in a concentration below 10 per cent by weight based on furfural therein, and recovering from effluents of said reaction a lactone characterized by the empirical formula $C_9H_{12}O_3$, as a product of the process.

21. A composition of matter substantially free from other compounds formed during its preparation and formed by the interreaction of a butadiene with a furfural in the presence of water at a temperature in the range of from 160–300° F., selected from the group consisting of an aldehyde characterized by the formula

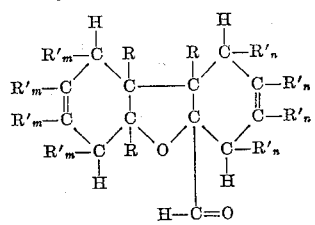

where each R is of the group consisting of hydrogen and methyl and at least one is hydrogen, and each R' is of the group consisting of hydrogen and an alkyl group having not more than three carbon atoms with the sum of the carbon atoms in the R'$_m$ and in the R'$_n$ in each case, not greater than three and at least two of the R'$_m$ and of the R'$_n$ are hydrogen, and a lactone characterized by the empirical formula $C_9H_{12}O_3$.

References Cited in the file of this patent

UNITED STATES PATENTS

| Number | Name | Date |
|---|---|---|
| 1,933,715 | Day | Nov. 7, 1933 |
| 2,350,609 | Hachmuth | June 6, 1944 |
| 2,372,688 | Hachmuth | Apr. 3, 1945 |
| 2,411,785 | Hachmuth | Nov. 26, 1946 |
| 2,428,120 | Miller | Sept. 30, 1947 |
| 2,485,070 | Schulze | Oct. 18, 1949 |
| 2,494,325 | Anne | Jan. 10, 1950 |